US010029858B2

(12) United States Patent
Giacomini

(10) Patent No.: US 10,029,858 B2
(45) Date of Patent: Jul. 24, 2018

(54) EQUIPMENT FOR STACKING ITEMS SUCH AS CANS AND ARRANGING THEM ACCORDING TO A PREDETERMINED ORDER ON A STACKING PLATFORM

(71) Applicant: AKMER-SERVICIOS DE CONSULTADORIA E MARKETING LDA, Madeira (PT)

(72) Inventor: Pio Guido Giacomini, Massagno (CH)

(73) Assignee: AKMER-SERVICIOS DE CONSULTADORIA E MARKETINGS LDA, Madeira (PT)

( * ) Notice: Subject to any disclaimer, the term of this patent is extended or adjusted under 35 U.S.C. 154(b) by 0 days.

(21) Appl. No.: 14/899,490

(22) PCT Filed: Jun. 13, 2014

(86) PCT No.: PCT/IB2014/001063
§ 371 (c)(1),
(2) Date: Dec. 17, 2015

(87) PCT Pub. No.: WO2014/203057
PCT Pub. Date: Dec. 24, 2014

(65) Prior Publication Data
US 2016/0145051 A1    May 26, 2016

(30) Foreign Application Priority Data
Jun. 19, 2013    (CH) .................................... 1147/13

(51) Int. Cl.
*B65G 47/26* (2006.01)
*B65G 47/08* (2006.01)
*B65G 57/24* (2006.01)

(52) U.S. Cl.
CPC ......... *B65G 47/088* (2013.01); *B65G 57/245* (2013.01)

(58) Field of Classification Search
CPC .......................... B65G 47/088; B65G 57/245
(Continued)

(56) References Cited

U.S. PATENT DOCUMENTS 3,005,548 A * 10/1961 Flanders .................. A23N 4/04
209/539
3,008,281 A * 11/1961 Wayne .................... B65B 61/28
198/448

(Continued)

OTHER PUBLICATIONS

International Search Report, dated Dec. 4, 2014, from corresponding PCT Application.

*Primary Examiner* — Rakesh Kumar
(74) *Attorney, Agent, or Firm* — Young & Thompson

(57) ABSTRACT

Equipment for stacking and arranging items according to a predetermined order on a platform includes at least:
one conveyor belt extending along a feed direction;
one plurality of rollers arranged transversely to the feed direction;
the conveyor belt being combined with the rollers so that rotation of the rollers in a way causes rotation of the conveyor belt in the same way;
one first roller of the plurality of rollers being driven by a motor for driving the rotation of the conveyor belt;
one transmission assembly for transmitting the motion from the motor to the driven roller;
the conveyor belt including at least a first central and at least two side portions opposed with respect to the central portion; the central portion moving at a speed v1 along the feed direction, the first side portion moving at a speed v2 along the feed direction; and v2>v1.

15 Claims, 5 Drawing Sheets

(58) Field of Classification Search
USPC .......................................................... 198/418
See application file for complete search history.

(56) References Cited

U.S. PATENT DOCUMENTS

| | | | | |
|---|---|---|---|---|
| 3,084,090 | A * | 4/1963 | Rambo | B27D 1/04 |
| | | | | 156/296 |
| 3,522,890 | A | 8/1970 | Birchall | |
| 3,604,551 | A * | 9/1971 | Fink | B65G 47/5145 |
| | | | | 198/347.1 |
| 3,937,336 | A | 2/1976 | Carlson | |
| 4,162,722 | A * | 7/1979 | Early | B65G 47/29 |
| | | | | 198/418 |
| 4,834,605 | A * | 5/1989 | Jerred | B65G 47/088 |
| | | | | 198/434 |
| 5,080,551 | A * | 1/1992 | Jerred | B65G 47/088 |
| | | | | 198/458 |
| 5,228,550 | A * | 7/1993 | Munch | B65G 47/715 |
| | | | | 198/447 |
| 6,398,461 | B1 * | 6/2002 | Vincent | B65G 47/088 |
| | | | | 406/79 |

\* cited by examiner

EQUIPMENT FOR STACKING ITEMS SUCH AS CANS AND ARRANGING THEM ACCORDING TO A PREDETERMINED ORDER ON A STACKING PLATFORM

FIELD OF THE INVENTION

The present invention concerns an equipment for stacking items such as cans and arranging them according to a predetermined order on a stacking platform.

KNOWN ART

These equipments are usually known as palletizers.

In order to stack items, such as cans, on storage and transport pallets, it is desirable to arrange the cans in a predetermined arrangement saving space.

It is then necessary, partly, that the array of stacked cans takes a predetermined spatial arrangement adapted to optimize the number of cans having determined size that can be stacked on a pallet having a specific size, as it will be cleared hereinafter.

An arrangement proved to achieve the afore mentioned features is that one having the array represented in FIG. 1.

The array 50 is formed by a plurality of adjacent rows of cans along the feed direction shown by the arrow F in FIG. 1.

The feed front of the array is formed by a first row 51 of cans, spread out by a second row of cans 52 so that each can 53 of the first row 51 is adjacent, in an axial direction, to a can 54 of the second row 52.

In the scope of the present invention, with the term "transversal direction" is intended a direction substantially orthogonal to the feed direction (represented in FIG. 1 by the arrow F) on the palletizer of the array 50 of cans.

The first row 51 and the second row 52 are staggered in the feed direction F.

In other terms, each can 53 of the first row 51 is alternated to a can 54 of the second row 52, the cans 53 of the first row 51 has the radially outermost point of their perimeter or profile that is axially and reciprocally aligned.

Also the cans 54 of the second row 52 have the radially outermost point of their profile that is transversely and reciprocally aligned.

The cans 54 of the second row 52 have the radially outermost point of their profile that is not transversely aligned with the radially outermost points of the cans 53 of the first row 51, but they are staggered in the feed direction.

The mutual arrangement of the first and second rows is repeated in all the successive rows of the array 50 in the feed direction F.

A corresponding array is placed over every array 50 of the afore described type, i.e. an additional array 50 that should have the same shape and size, up to form a stack 60, for example placed on a wood pallet 57, as that shown in FIG. 2.

The Applicant noticed that, by using the afore described arrangement for stacking two layers of cans or two arrays, can happen that the second layer has not the cans of the first row 51 of the front in a position corresponding to those of the first row 51 of the front of the second layer.

In other terms, it is possible that the cans 53 of the second layer are positioned at "voids" made by the arrangement of cans 53 of the first row alternating with that of the second row 52, as previously described.

Such a situation makes disorders in the stacking or overlapping of the two layers or arrays of cans, and consequently in the whole stack of layers.

Such a drawback makes interruptions in the stacking process, leading to efficiency and time losses, and costs.

It is further possible that the cans become damaged, thereby generating waster.

The Applicant has further noticed that the situation becomes particularly critical if the "void" in the underlying layer of cans is generated in positions that are more outside in the transverse direction, i.e. at the angles of the array or layer.

Therefore the Applicant dealt with the question of realizing an equipment for stacking items such as cans and arranging them according to a predetermined order on a stacking platform that allows to solve the afore stated drawbacks of the known art.

SUMMARY OF THE INVENTION

Therefore, in its first aspect the invention concerns an equipment for stacking items such as cans and arranging them according to a predetermined order on a stacking platform of the type comprising:

at least one conveyor belt extending along a feed direction F;

at least one plurality of rollers arranged transversely to the feed direction; said conveyor belt being combined with said rollers so that the rotation of said rollers in a way causes the rotation of the conveyor belt in the same way;

at least one first roller of said plurality of rollers being driven by a motor for driving the rotation of said conveyor belt;

at least one transmission assembly for transmitting the motion from said at least one motor to said driven roller;

at least one countering element extending transversely to the feed direction (F); said countering element having a corrugated profile extending transversely to said feed direction (F) so that to contact the items fed on said conveyor belt;

characterized in that said conveyor belt comprises at least three portions of which one is a first central portion and at least two are side portions opposed with respect to the central portion;

said central portion is adapted to move at a speed v1 along the feed direction F;

said first side portions are adapted to move at a speed v2 along the feed direction F; being v2 greater than v1. The present invention, in the afore said aspect, may present at least one of the preferred characteristics hereinafter described.

Preferably, the conveyor belt has two second side portions axially arranged on the outside of said two first side portions.

Advantageously, the second portions are adapted to move at a speed v3, being v3 greater than v2.

Conveniently, said at least one first roller of said plurality of rollers is arranged at an end of said conveyor belt and is connected to an electric motor through a transmission assembly.

Advantageously, said transmission assembly comprises a chain drive interposed between a motor output shaft and a motion return pinion keyed on a rotation shaft of said first roller.

Preferably, the conveyor belt has a second roller placed downstream of said first roller; said second roller being driven by a second motor and a reduction gear to transmit the motion to said first side portions through a second transmission assembly.

Conveniently, the conveyor belt has a third roller placed downstream of said second roller; said third roller being driven by the second motor and said reduction gear to transmit the motion to said second side portions through a third transmission assembly.

Advantageously, said second transmission assembly has a first pinion keyed to the drive shaft, a gearing chain and a second pinion keyed to the rotation shaft of said second roller.

Preferably, said third transmission assembly has a fourth pinion keyed to the drive shaft, a second gearing chain and a fifth pinion keyed to the rotation shaft of said third roller.

Advantageously, the third pinion has a diameter different from the fifth pinion.

Preferably, the conveyor belt comprises a fourth idle roller placed at the end opposite to said first roller of the conveyor belt.

Preferably, the corrugated profile is mobile along the feed direction (F).

Advantageously, the countering element comprises a plurality of pads, each combinable with an item carried by said conveyor belt, the pads of said plurality being arranged transversely to the feed direction (F) and translatable vertically with respect to said conveyor belt between a blocked position, in which they block the position of the items carried by the conveyor belt, and a rest position separated from said conveyor belt in which they leave the carried items free to be fed along the feed direction (F).

Conveniently, the conveyor belt comprises a trapdoor portion that can be opened to create a lowering window for an array.

Further characteristics and advantages of the invention will be more evident from the detailed description of some preferred embodiments, but not exclusive, of an equipment for stacking items such as cans and arranging them according to a predetermined order on a stacking platform according to the present invention.

BRIEF DESCRIPTION OF THE DRAWINGS

Such a description will be hereinafter explained referring to the attached drawings, provided for purposes of illustrations only, and thereby not limitative, wherein.

DETAILED DESCRIPTION OF SOME EMBODIMENTS OF THE INVENTION

Figure 1:
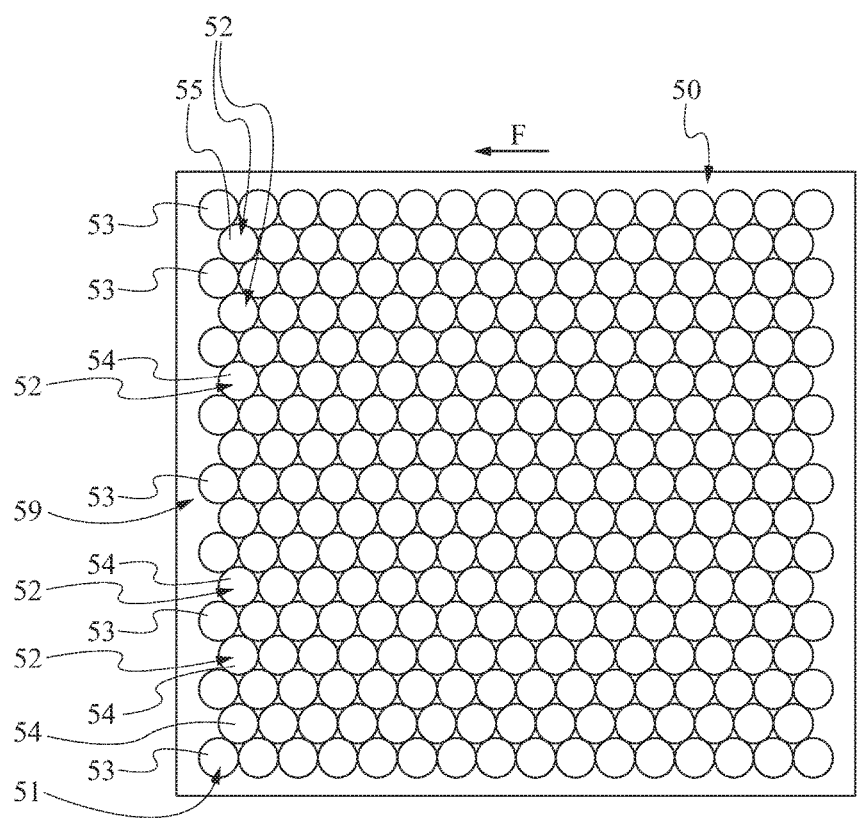
FIG. 1 is a top view of an array of cans which are adapted to form a stacking layer for a can row.
Figure 2:
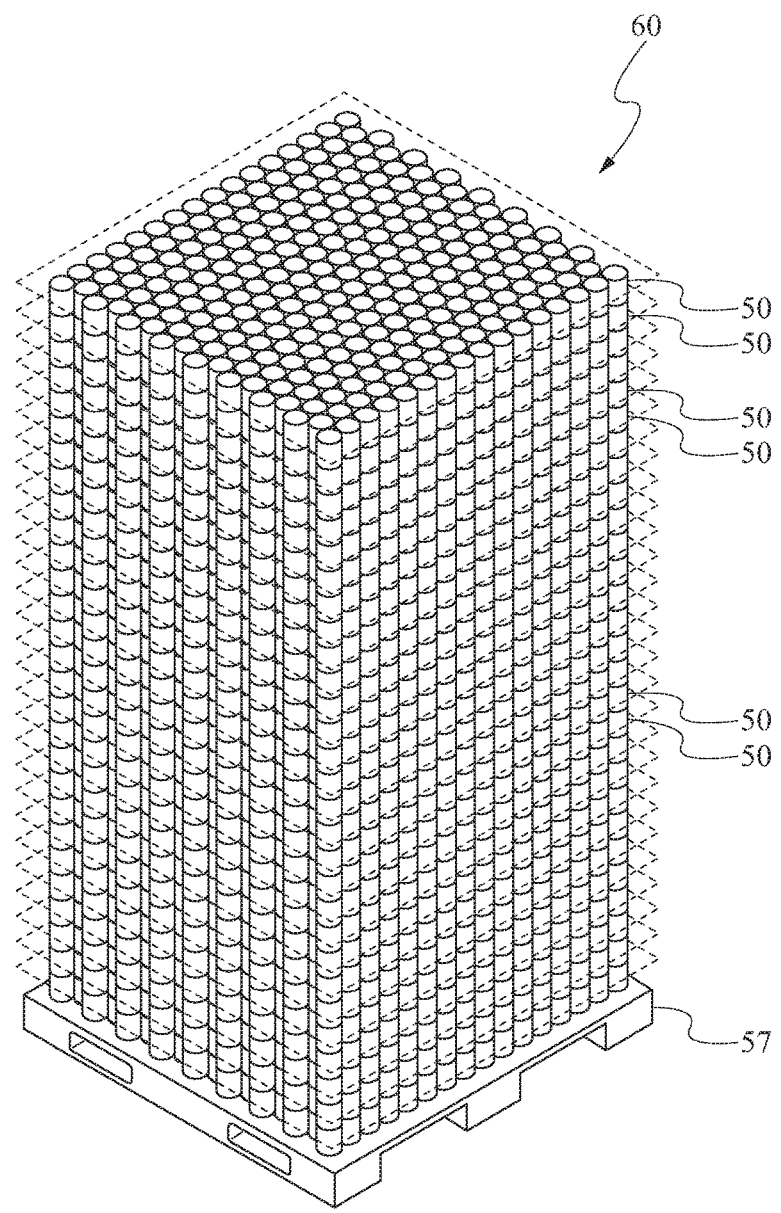
FIG. 2 is a perspective view of a can stack formed by several overlapped arrays or layers, such as that one shown in FIG. 1.
Figure 3:
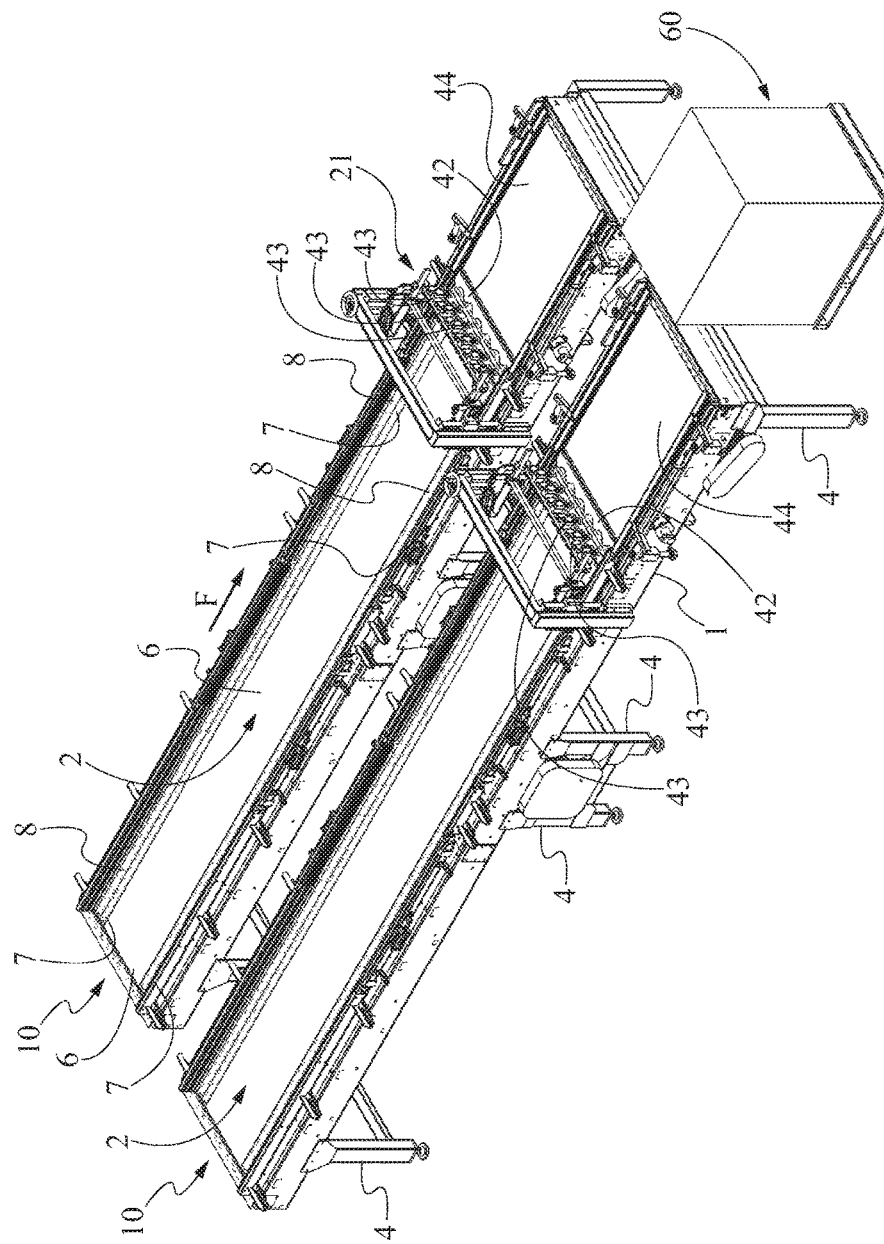
FIG. 3 is a schematic view of two equipments placed side by side for stacking items such as cans and arranging them according to a predetermined order on a stacking platform according to the present invention.
Figure 4:
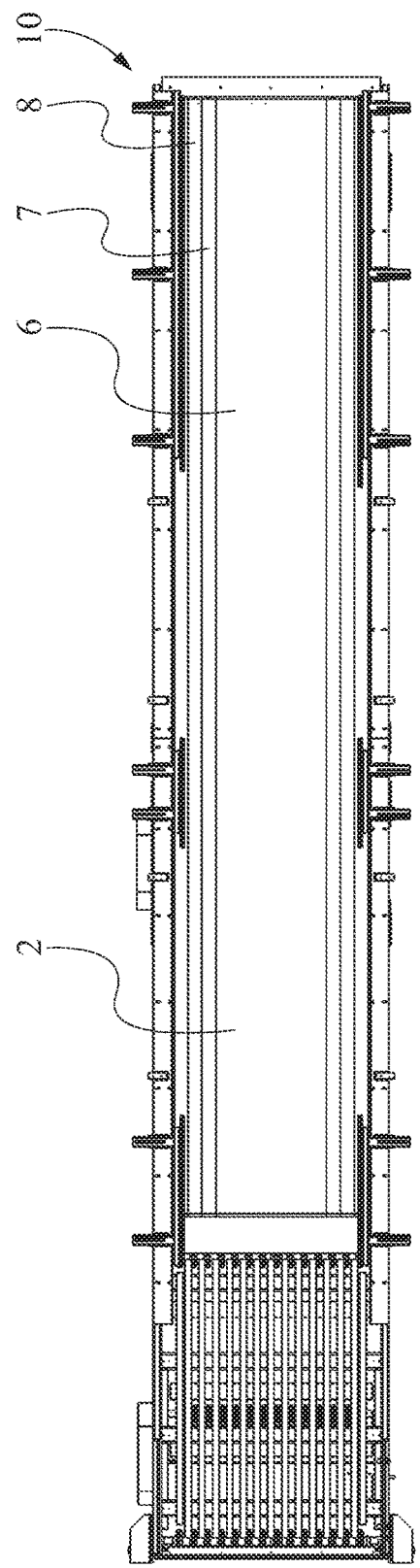
FIG. 4 is a top schematic view of an equipment for stacking items such as cans and arranging them according to a predetermined order on a stacking platform according to the present invention.
Figure 5:
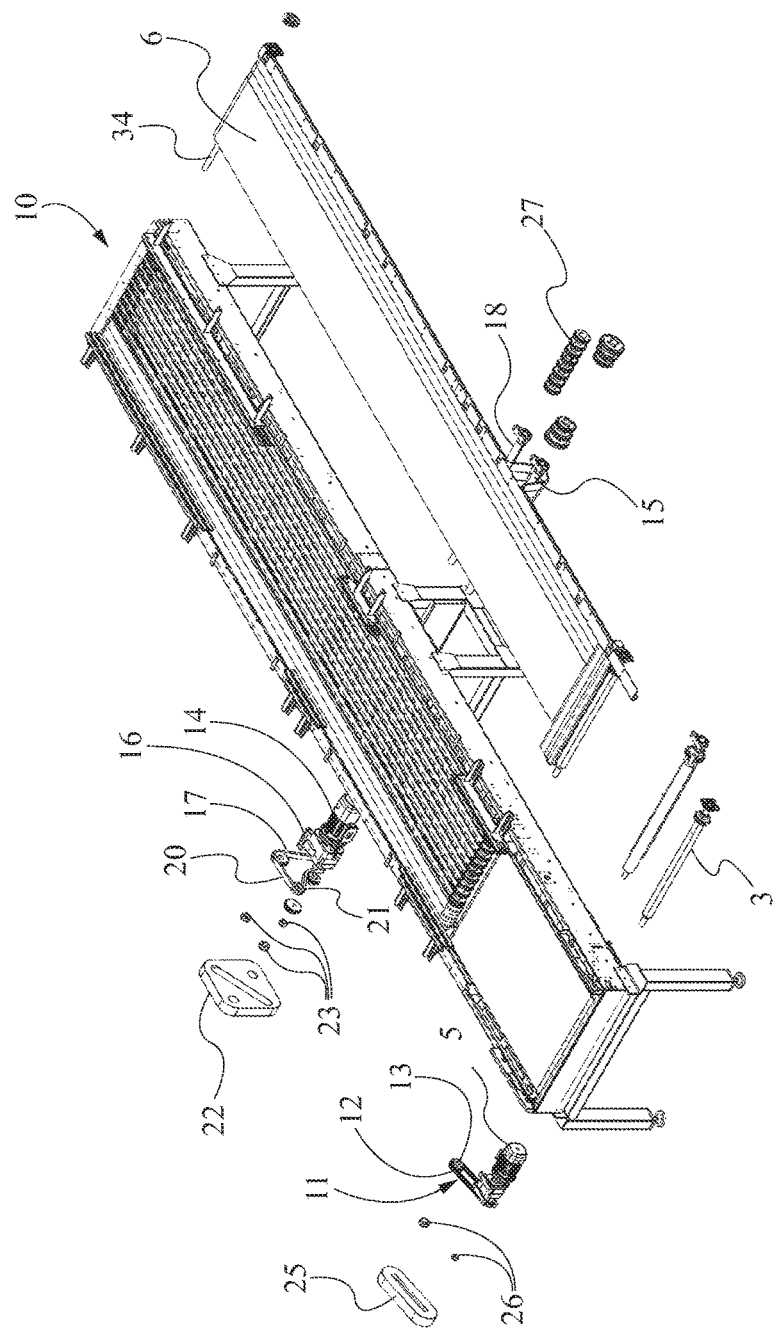
FIG. 5 is a perspective and partially exploded schematic view of an equipment for stacking items such as cans and arranging them according to a predetermined order on a stacking platform according to the present invention.

Referring to FIGS. 3-5, an equipment for stacking items such as cans 53, 54 and for arranging them according to a predetermined order on a stacking platform according to the present invention, is identified with the reference numeral 10.

The equipment 10 for stacking items according to the present invention has a bed 1 provided with feet 4 for the support on the ground.

The bed 1 supports a conveyor belt 2 extending along a feed direction (F) and a plurality of rollers arranged transversely to the feed direction.

The conveyor belt 2 is combined with the rollers in such a way that the rotation of the rollers in a way causes the rotation of the conveyor belt 2 in the same way.

The equipment further comprises a countering element 21 arranged transversely to the conveyor belt 2 and the feed direction F. The countering element 21 comprises a corrugated shaped profile 42 placed transversely to the feed direction F for the whole length of the conveyor belt 2.

The shaped profile has, as shown in figure, a corrugated profile, the shape of the corrugated profile corresponding to the negative of the feed front of the array of carried items.

In other terms, the feed front is composed of a first row of items such as cans, which are spread out by a second row of cans so that each can of the first row is adjacent, in the transversal direction, to a can of the second row.

The shaped profile 42 is movable along the feed direction (F), so that to cooperate with the conveyor belt 2 to stop the array 50.

In other terms, as the rows of the array 50 form, the shaped profile translates according to the feed way to form an array 50 and to allow the latter to be transferred to a specified position of the conveyor belt where there is a trapdoor portion 44 that can be opened to create a lowering window in the conveyor belt 2 in which the array 50 can go down.

The countering element 21 is further provided with a plurality of pads 43 arranged as the first two rows of cans in an array 50.

Each pad 43 can be combined with an item carried by said conveyor belt 2, i.e. a can.

The pads 43 of said plurality are translatable vertically with respect to the conveyor belt 2 between a blocked position, in which they block the position of the items carried by the conveyor belt 2, and a rest position, separated from the conveyor belt 2 in which they leave the carried items free to be fed along the feed direction (F).

In particular, the pads 43 of said plurality are lowered to the blocked position as an array 50 is formed and they go down in order to block the first two item rows that will compose the subsequent array 50, thereby allowing the previously formed array to be fed and moved at the trapdoor portion 44.

Turning back to the equipment 10 and referring to FIGS. 3-5, in particular it can be seen the equipment having a first roller 3 driven by a motor 5 for driving the rotation of said conveyor belt 2.

The motor 5 is preferably an electric motor.

The first roller 3 of the plurality of rollers is connected to the electric motor 5 through a transmission assembly 11. The transmission assembly 11 can include a case 25 and return gear wheels 26.

In the embodiment of FIG. 5, the transmission assembly 11 comprises a chain drive 12 interposed between a motor output shaft and a motion return pinion 13 keyed on a rotation shaft of said first roller 3.

The first roller 2 is placed at one of the two free ends of the conveyor belt 2 with respect to the feed direction F at the end placed most downstream.

Another roller 34 is placed at the opposite end. Such a roller, named fourth roller 34, is idle.

The conveyor belt 2 comprises at least three portions 6, 7 of which one is a first central portion 6 and at least two are side portions 7 opposed with respect to the central portion 6.

The first central portion 6 and the two first side portions 7 have the same axial extent, i.e. along the feed direction F.

The first two side portions 7 have a length appreciably shorter than the width of the first central portion 6.

The width of the afore said portions is measured in the direction orthogonal to the feed direction F.

Preferably, each first side portion 7 has a width shorter than 20% of the width of the central portion 6.

The central portion 6 is adapted to move at a speed v1 along the feed direction F.

The first two side portions 7 are adapted to move at the same speed and, in detail, at a speed v2 along the feed direction F; being v2 greater than v1.

In the embodiment shown in FIGS. 3-5, the conveyor belt 2 has two second side portions 8 axially arranged on the outside of said two first side portions 7.

The two side portions 8 have the same axial longitudinal extent, i.e. along the feed direction F, of the first central portion 6 and the two first side portions 7.

The second two side portions 8 have a length appreciably shorter than the width of the first central portion 6.

Preferably, each second side portion 8 has a width shorter than 20% of the width of the central portion 6.

In the embodiment shown in FIGS. 3-5, the two second side portions 8 have a width comparable to that of the two first side portions 7.

The second side portions 8 are adapted to move at a speed v3 along the feed direction F; being v3 greater than v2.

For this purpose, the central portion 6 is rotated by a first roller 3 and the motor 4, whereas a second motor 14 moves the first and second side portions 7, 8 of the conveyor belt 2.

In the embodiment shown in FIGS. 3-5, the equipment 10 has a second roller 15 placed downstream of the first roller 3 and spaced apart therefrom along the feed direction F.

The second roller 15 is driven by the second motor 14 and a reduction gear 16 to transmit the motion to the first side portions 7 through a second transmission assembly 17.

Always referring to the embodiment shown in FIGS. 3-5, the equipment 10 according to the present invention has a third roller 18 placed downstream of the second roller 15.

The third roller 18 is driven by the second motor 14 and a reduction gear 16 to transmit the motion to the second side portions 8 through a third transmission assembly, not shown in figure.

The second transmission assembly 17 has a first pinion keyed to the shaft of the second motor 14, a gearing chain 20 and a second pinion 30 keyed to the rotation shaft of said second roller 15.

A case 22 for the second transmission assembly 17 and a series of return gear wheels 23 can be present, of which the positioning and functioning is not described in detail because known to the person skilled of the art.

Analogously, also if not shown in figure, the third transmission assembly has a fourth pinion keyed to the shaft of the second motor 14, a second gearing chain and a fifth pinion keyed to the rotation shaft of the third roller 18. Rings 27 can be associated with the rollers.

In order to move at different speeds the gearing chains 17, 20, respectively, and consequently the first 7 and second 8 side portions, the third pinion has a diameter different from that of the fifth pinion.

To the embodiments herein represented in detail various modifications can be made, anyway remaining in the protection scope of the invention, defined by the following claims.

The invention claimed is:

1. An apparatus for stacking and arranging items according to a predetermined order on a stacking platform, comprising:
    at least one conveyor belt extending along a feed direction;
    at least one plurality of rollers arranged transversely to the feed direction; said conveyor belt being combined with said rollers so that rotation of said rollers and rotation of the conveyor belt are in a same direction;
    at least one first roller of said plurality of rollers being driven by a motor driving rotation of said conveyor belt;
    at least one transmission assembly transmitting motion from said at least one motor to said first roller;
    at least one countering element extending transversely to the feed direction; said countering element having a corrugated profile extending transversely to said feed direction so to contact the items fed on said conveyor belt;
    wherein said conveyor belt comprises at least three portions of which one portion is a first central portion and at least two are first side portions opposed with respect to the central portion;
    said central portion is adapted to move at a speed v1 along the feed direction;
    said first side portions are adapted to move at a speed v2 along the feed direction with v2 being greater than v1, wherein
    each first side portion has a width shorter than 20% of a width of the central portion.

2. The apparatus for stacking and arranging items according to claim 1, wherein the items are cans.

3. The apparatus for stacking and arranging items according to claim 1, further comprising a trapdoor portion that can be opened to create a lowering window in said conveyor belt.

4. The apparatus for stacking and arranging items according to claim 1, wherein said at least one first roller of said plurality of rollers is arranged at an end of said conveyor belt and is connected to an electric motor through a transmission assembly.

5. The apparatus for stacking and arranging items according to claim 4, wherein said transmission assembly comprises a chain or belt drive interposed between a motor output shaft and a motion return pinion keyed on a rotation shaft of said first roller.

6. The apparatus for stacking and arranging items according to claim 4, further comprising a second roller placed downstream of said first roller, said second roller being driven by a second motor and a reduction gear to transmit motion to said first side portions through a second transmission assembly.

7. The apparatus for stacking and arranging items according to claim 6, further comprising a third roller placed downstream of said second roller, said third roller being driven by the second motor and said reduction gear to transmit motion to said second side portions.

8. The apparatus for stacking and arranging items according to claim 6, wherein said second transmission assembly has a first pinion keyed to the shaft of the second motor, a gearing chain and a second pinion keyed to the rotation shaft of said second roller.

9. The apparatus for stacking and arranging items according to claim 7, wherein said second transmission assembly has a first pinion keyed to the shaft of the second motor, a gearing chain and a second pinion keyed to the rotation shaft of said second roller.

10. The apparatus for stacking and arranging items according to claim 5, further comprising a second roller placed downstream of said first roller; said second roller being driven by a second motor and a reduction gear to transmit the motion to said first side portions through a second transmission assembly.

11. The apparatus for stacking and arranging items according to claim 4, further comprising a fourth idle roller placed at the end opposite to said first roller of the conveyor belt.

12. The apparatus for stacking and arranging items according to claim 1, wherein said corrugated profile is mobile along the feed direction.

13. The apparatus for stacking and arranging items according to claim 1, wherein said countering element comprises a plurality of pads, each pad being combinable with an item carried by said conveyor belt, the pads of said plurality being arranged transversely to the feed direction and translatable vertically with respect to said conveyor belt between a blocked position, in which they block the position of a predetermined number of items carried by said conveyor belt, and a rest position separated from said conveyor belt in which they leave the carried items free to be fed along the feed direction.

14. An apparatus for stacking and arranging items according to a predetermined order on a stacking platform, comprising:
    at least one conveyor belt extending along a feed direction;
    at least one plurality of rollers arranged transversely to the feed direction; said conveyor belt being combined with said rollers so that rotation of said rollers and rotation of the conveyor belt are in a same direction;
    at least one first roller of said plurality of rollers being driven by a motor driving rotation of said conveyor belt;
    at least one transmission assembly transmitting motion from said at least one motor to said first roller;
    at least one countering element extending transversely to the feed direction; said countering element having a corrugated profile extending transversely to said feed direction so to contact the items fed on said conveyor belt;
    wherein said conveyor belt comprises at least five portions of which a first portion is a first central portion, second and third portions are opposed with respect to the central portion, and fourth and fifth side portions adjacent to the respective second and third side portions, and the fourth and fifth side portions are farther from the central portion than the respective second and third side portions;
    said central portion is adapted to move at a speed v1 along the feed direction;
    said second and third side portions are adapted to move at a speed v2 along the feed direction with v2 being greater than v1, wherein
    each second side portion has a width shorter than 20% of a width of the central portion.

15. The apparatus for stacking and arranging items according to claim 14, wherein said fourth and fifth side portions are adapted to move at a speed v3, being v3 greater than v2.

* * * * *